US009674192B2

(12) United States Patent
Nguyen et al.

(10) Patent No.: US 9,674,192 B2
(45) Date of Patent: Jun. 6, 2017

(54) SECURITY ACCESS FOR A SWITCH DEVICE (71) Applicant: Gigamon Inc., Milpitas, CA (US)

(72) Inventors: Hung Nguyen, San Jose, CA (US); Jay Han Yu, San Jose, CA (US); Patrick Allen Riley, San Jose, CA (US); Hoang Nguyen Bao Nguyen, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 20 days.

(21) Appl. No.: 13/915,490

(22) Filed: Jun. 11, 2013

(65) Prior Publication Data
US 2014/0366097 A1 Dec. 11, 2014

(51) Int. Cl.
*G06F 7/04* (2006.01)
*H04L 29/06* (2006.01)

(52) U.S. Cl.
CPC .................. *H04L 63/10* (2013.01)

(58) Field of Classification Search
CPC .............................. H04L 63/08; H04L 63/10
USPC ...................................................... 726/2–4
See application file for complete search history.

(56) References Cited

U.S. PATENT DOCUMENTS

| 7,424,018 | B2 | 9/2008 | Gallatin et al. |
| 7,436,832 | B2 | 10/2008 | Gallatin et al. |
| 7,440,467 | B2 | 10/2008 | Gallatin et al. |
| 7,792,047 | B2 | 9/2010 | Gallatin et al. |
| 8,068,821 | B2 * | 11/2011 | Bhatia ................ H04L 12/5895 370/329 |
| 8,315,256 | B2 | 11/2012 | Leong et al. |
| 2006/0168648 | A1 | 7/2006 | Vank et al. |
| 2007/0294416 | A1 | 12/2007 | Agre et al. |
| 2009/0067440 | A1 * | 3/2009 | Chadda et al. ............... 370/401 |
| 2009/0193129 | A1 * | 7/2009 | Agarwal et al. .............. 709/229 |
| 2010/0146599 | A1 * | 6/2010 | Padmanabha ......... G06F 21/335 726/5 |
| 2011/0058566 | A1 | 3/2011 | Leong et al. |
| 2013/0036469 | A1 * | 2/2013 | Worth ................ H04L 63/1408 726/23 |

OTHER PUBLICATIONS

International Search Report and the Written Opinon dated Oct. 22, 2014 for related PCT Patent Application No. PCT/US14/41796, 10 pages.

* cited by examiner

*Primary Examiner* — Anthony Brown
(74) *Attorney, Agent, or Firm* — Perkins Coie LLP (57) ABSTRACT A method for providing user access to a network switch appliance, includes: receiving from a user a request to access configuration item for the network switch appliance, the network switch appliance configured to pass packets received from a network to network monitoring instruments; and determining, using a processing unit, whether to allow the user to access the configuration item for the network switch appliance based on information regarding the user.

43 Claims, 7 Drawing Sheets

| Tasks | Access level for Source ports | Access level for Destination ports |
|---|---|---|
| View | 1 | 1 |
| Create/delete tool-mirror | 2 | 2 |
| Editing tool port list | 2 | 2 for diff ports |
| Add/delete map rules | 3 | 3(*) |
| Add/delete map | 3 | 3(*) |
| Change port params, Add/edit port-pair | 4 | 4 |

FIG. 3

| Role | Tasks | | | | | |
|---|---|---|---|---|---|---|
| | View | Create/delete Tool-mirror | Edit tool Port list | Add/delete Map rules | Add/delete Map | Change port params |
| 2 | X | X | X | | | |
| 3 | X | X | X | X | X | |

SECURITY ACCESS FOR A SWITCH DEVICE

FIELD

This application relates generally to network switch devices, and more specifically, to systems and methods for providing access to a network switch appliance.

BACKGROUND

A network switch appliance may be configured to receive packets from a network, and pass packets to one or more network instruments downstream through one or more ports at the network switch appliance. In some cases, a user of the network switch appliance may configure the network switch appliance to perform in a certain manner. For example, the user may create a logical connection between an ingress port and an egress port to deliver traffic to certain instrument for analysis. The user may also apply filters to reduce the traffic that are sent to the instrument.

SUMMARY

In some cases, it may be desirable for one or more network switch devices to be used and shared by multiple users. In such cases, it may be desirable to restrict access to the ports of the network switch device(s) to enhance the security of the device(s). For example, it may be desirable that certain user(s) be allowed to monitor a certain number of network ports. As another example, it may be desirable that certain user(s) be allowed to configure the network switch device so that certain traffics are sent and filtered to certain instrument port(s) for transmission of traffics to certain network monitoring instrument(s). Restricting access may prevent unauthorized access to sensitive network data, and may also provide controlled integrity of the data sent to the instruments.

A method for providing user access to a network switch appliance, includes: receiving from a user a request to access configuration item for the network switch appliance, the network switch appliance configured to pass packets received from a network to network monitoring instruments; and determining, using a processing unit, whether to allow the user to access the configuration item for the network switch appliance based on information regarding the user.

Optionally, the information regarding the user comprises a user identification, an access level that has been assigned to the user, or both.

Optionally, the access level is associated with a role assigned for the user.

Optionally, the access level prescribes which network port(s) at the network switch appliance is accessible for the user.

Optionally, the access level prescribes which instrument port(s) at the network switch appliance is accessible for the user.

Optionally, the access level prescribes which task(s) is allowed to be performed by the user to configure the network switch appliance.

Optionally, the method further includes determining an access level for the user.

Optionally, the network switch appliance comprises network ports for receiving the packets from the network, and the method further comprises providing access for the user to certain one or ones of the network ports based on the access level for the user.

Optionally, the network switch appliance comprises instrument ports for communicating with the network monitoring instruments, and the method further comprises providing access for the user to certain one or ones of the instrument ports based on the access level for the user.

Optionally, the act of determining the access level for the user comprises looking up access information that is stored in a non-transitory medium.

Optionally, the non-transitory medium is in the network switch appliance.

Optionally, the non-transitory medium comprises a database that is communicatively coupled to the network switch appliance.

Optionally, the method further includes: receiving a request from the user to implement a configuration for the network switch appliance, wherein the configuration involves one or more network ports at the network switch appliance, one or more instrument ports at the network switch appliance, or both; and determining whether to allow the user to implement the configuration based on the access level for the user.

Optionally, the act of determining whether to allow the user to implement the configuration comprises looking up a table in which multiple access levels are associated with respective sets of allowable tasks.

Optionally, the table comprises: a first access level associated with a first set of one or more allowable tasks; and a second access level associated with a second set of one or more allowable tasks that is different from the first set.

Optionally, the one or more allowable tasks in the first set comprises one or a combination of: view, create tool-mirror, delete tool-mirror, edit tool port list, add map rule, delete map rule, add map, delete map, add port-pair, edit port-pair, and change port configuration.

Optionally, the act of determining whether to allow the user to implement the configuration further comprises determining which of the first and second access levels matches with the access level for the user.

Optionally, the processing unit is a part of the network switch appliance.

An apparatus for providing user access to configuration item for a network switch appliance, includes: a processing unit configured for: receiving from a user a request to access the configuration item for the network switch appliance, the network switch appliance configured to pass packets received from a network to network monitoring instruments; and determining whether to allow the user to access the configuration item for the network switch appliance based on information regarding the user.

Optionally, the information regarding the user comprises a user identification, an access level that has been assigned to the user, or both.

Optionally, the access level is associated with a role assigned for the user.

Optionally, the access level prescribes which network port(s) at the network switch appliance is accessible for the user.

Optionally, the access level prescribes which instrument port(s) at the network switch appliance is accessible for the user.

Optionally, the access level prescribes which task(s) is allowed to be performed by the user to configure the network switch appliance.

Optionally, the processing unit is further configured for determining an access level for the user.

Optionally, the network switch appliance comprises network ports for receiving the packets from the network, and the processing unit is further configured for providing access for the user to certain one or ones of the network ports based on the access level for the user.

Optionally, the network switch appliance comprises instrument ports for communicating with the network monitoring instruments, and the processing unit is further configured for providing access for the user to certain one or ones of the instrument ports based on the access level for the user.

Optionally, the processing unit is configured to determine the access level for the user by looking up access information that is stored in a non-transitory medium.

Optionally, the non-transitory medium is in the network switch appliance.

Optionally, the non-transitory medium comprises a database that is communicatively coupled to the network switch appliance.

Optionally, the processing unit is further configured for: receiving a request from the user to implement a configuration for the network switch appliance, wherein the configuration involves one or more network ports at the network switch appliance, one or more instrument ports at the network switch appliance, or both; and determining whether to allow the user to implement the configuration based on the access level for the user.

Optionally, the processing unit is configured to determine whether to allow the user to implement the configuration by looking up a table in which multiple access levels are associated with respective sets of allowable tasks.

Optionally, the table comprises: a first access level associated with a first set of one or more allowable tasks; and a second access level associated with a second set of one or more allowable tasks that is different from the first set.

Optionally, the one or more allowable tasks in the first set comprises one or a combination of: view, create tool-mirror, delete tool-mirror, edit tool port list, add map rule, delete map rule, add map, delete map, add port-pair, edit port-pair, and change port configuration.

Optionally, the processing unit is configured to determine whether to allow the user to implement the configuration by determining which of the first and second access levels matches with the access level for the user.

Optionally, the processing unit is a part of the network switch appliance.

Optionally, the processing unit is communicatively coupled to the network switch appliance.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

Figure 1:
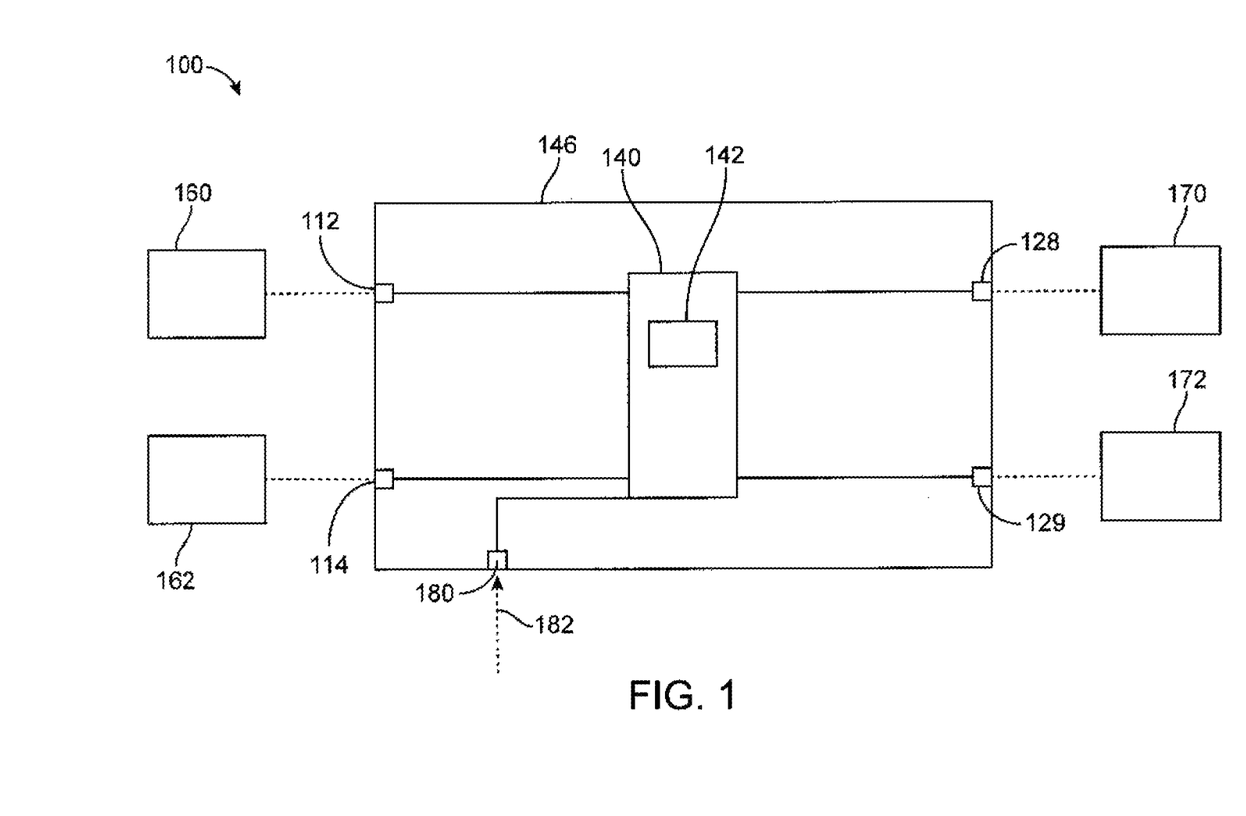
FIG. 1 illustrates a network switch appliance in accordance with some embodiments.

FIG. 1 illustrates a network switch appliance/device 100 in accordance with some embodiments. The network switch device 100 includes a first network port 112, a second network port 114, a first instrument port 128, and a second instrument port 129. The device 100 also includes a packet switch (switch module) 140 with a processing unit 142, a processor 144, and a network switch housing 146 for containing the packet switch 140 and the processor 144. In the illustrated embodiments, the device 100 also includes other components, such as a Network PHY (not shown) coupled to each of the respective ports 112, 114, wherein the Network PHYs may be considered to be parts of the packet switch 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 146 allows the device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the device 100 may include more than two network ports. Also, although two instrument ports 128, 129 are shown, in other embodiments, the device 100 may include only one instrument port, or more than two instrument ports.

During use, the first network port 112 of the device 100 is communicatively coupled (e.g., via a network, such as the Internet) to a first node 160, and the second network port 114 is communicatively coupled (e.g., via a network, such as the Internet) to a second node 162. In some embodiments, the device 100 is configured to receive packets from nodes 160, 162 via the network ports 112, 114. Alternatively, or additionally, the device 100 may be configured to communicate packets between the first and second nodes 160, 162 via the network ports 112, 114. Also, during use, the instrument ports 128, 129 of the device 100 are communicatively coupled to respective instruments 170, 172. The instruments 170, 172 may be directly coupled to the device 100, or communicatively coupled to the device 100 through the network (e.g., Internet). In some cases, the device 100 is provided as a single unit that allows the device 100 to be deployed at a single point along a communication path. In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more instruments that are connected to respective instrument port(s) 128, 129. In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only non-virtualized packets. In further embodiments, one or more the network ports 112, 114 may be configured to receive only virtualized packets.

In one or more embodiments, the packet switch 140 may be any switch module that provides packet transmission in accordance with a pre-determined transmission scheme. In some embodiments, the packet switch 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 100 after the packets have been processed), such as an intrusion prevention system. In other embodiments, the packet switch 140 may be configured such that the packets may be transmitted in a one-to-many configuration (i.e., from one network port to multiple instrument ports). In other embodiments, the packet switch 140 may be configured such that the packets may be transmitted in a many-to-many configuration (i.e., from multiple network ports to multiple instrument ports). In further embodiments, the packet switch 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the device 100 receives the packets, the device 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 140 that may be used to implement features described herein include any of the commercially available network switch devices, such as GigaVUE™, that is available at Gigamon LLC. Other examples of packet switch 140 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 140 may have the functionalities of a conventional packet switch except that it provides visibility into various parts of a network. Thus, embodiments of the packet switch 140 may operate like a conventional managed packet switch, but providing packet monitoring function. This is accomplished by configuring the packet switch 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the packet switch 140 may be an "out-of-band" network switch, which is configured to obtain packets and pass them to an instrument or to a network that is different from that associated with the original intended destination of the packets.

Also, the term "out-of-band" device/switch refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the network switch device 100 may be an in-band device if it receives a packet (intended for transmission from node 1 to node 2) from a network, and passes the packet back to the network (e.g., after the packet has been processed by a pass-through monitoring tool) for transmission downstream to the node 2. The same network switch device 100 may also be an out-of-band device if it receives another packet from the network, and does not pass the packet back to the network for transmission to the intended receiving node.

It should be noted that the packet switch 140 that may be used with the device 100 is not limited to the examples described above, and that other packet switches 140 with different configurations may be used as well. Also, in one or more embodiments described herein, the packet switch 140 may be implemented using an integrated circuit, such as a processor (e.g., a general purpose processor, a network processor, an ASIC processor, a FPGA processor, etc.). Thus, the term "packet switch" or "switch module" may refer to any circuit that is capable of performing the functions described herein, and should not be limited to a switch or a processor.

In other embodiments, the network device 100 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 142 or the packet switch 140 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the packet switch 140. The packet switch 140 then transmits the packet to one or more of the instrument ports 128, 129 according to a pre-determined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. In some embodiments, the additional processing unit may be located outside the housing of the network device 100. In other embodiments, the additional processing unit may be a part of the packet switch 140. For example, the additional processing unit may be considered to be a part of the processing unit 142. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 142 is illustrated as a component of the packet switch 140. In other embodiments, the processing unit 142 may be a separate component from the packet switch 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. The processing unit 142 may be implemented using one or more processors, wherein one or more of the processors may be considered to be a part of the network switch device 100 or not. Also, in some embodiments, the packet switch 140 may include ternary content-addressable memory (TCAM). The packet switch 140 may be configured to perform various packet processing functions, included but not limited to packet filtering, packet routing, packet switching, packet mirroring, packet aggregation, etc.

As shown in the figure, the network switch device 100 further includes a port 180 for receiving configuration information 182 to thereby configure the packet switch 140 (e.g., the processing unit 142 in the packet switch). In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the device 100 may include multiple ports 180 for receiving configuration information 182. In some cases, one or more of the ports 180 may be used to implement the network ports 112, 114, thereby allowing the same port(s) 180 for receiving the configuration information 182 to also receive network traffic.

In some embodiments, the network switch device 100 may be used by multiple users. In some cases, there may be multiple users who are given access to configuration items for the network switch device 100. For example, different users may be given permission to view different operating parameters (e.g., filtering rule(s), map(s), port assignment, etc.) for the network switch device 100. As another example, different users may be given permission to different resources (e.g., software, devices, databases, software functions, device functions, database functions, etc.) for configuring the network switch device 100. Thus, as used in this specification, the term "configuration item" may refer to any operating parameter(s) utilized by the network switch device 100, any resource(s) that is involved in configuring the network switch device 100, or combination of both. The configuration item may be stored or implemented in the network switch device 100, or may be stored or implemented outside the network switch device 100.

Figure 2:
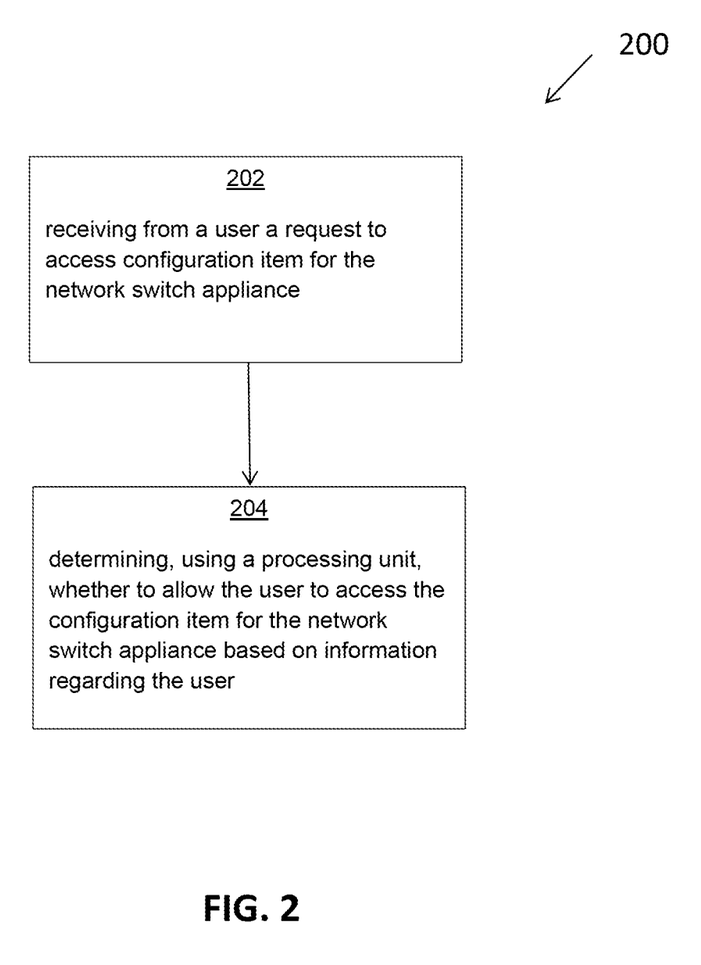
FIG. 2 illustrates a method for providing access to configuration item for a network switch appliance in accordance with some embodiments.

FIG. 2 illustrates a method 200 for providing access to configuration item for the network switch device 100 in accordance with some embodiments. In some embodiments, the method 200 may be performed by the network switch device 100 (e.g., by the processing unit 142 of the network switch device 100). In other embodiments, the method 200 may be performed by another processing unit, such as a processing unit that is communicatively coupled to the network switch device 100.

First, the processing unit receives from a user a request to access configuration item for the network switch device 100 (Item 202). In some embodiments, the processing unit may be a part of a device that includes a user interface for allowing the user to input the request. In such cases, the request is transmitted from the user interface to the processing unit. In other embodiments, the processing unit may be communicatively coupled (e.g., through a network, such as the Internet) to a user device at which the user input the request. In such cases, the request is transmitted from the user device to the processing unit. It should be noted that the term "user", as used in this specification, may refer to an entity, such as a person, a group of persons, a company, an association, or any device used by a person, a group of persons, a company, or an association.

In some embodiments, the configuration item for access by the user may be one or more operating parameters stored in the network switch device 100. In other embodiments, the configuration item may be one or more operating parameters stored outside the network switch device 100 (e.g., information stored in a non-transitory medium, in another device, etc.) that is communicatively coupled to the network switch device 100 through a communication channel (e.g., a wire, a cable, a Bluetooth channel, a network, an Internet, etc.). The stored operating parameter(s) inside, or remotely from, the network switch device 100 may be any information that affects an operation of the network switch device 100. By means of non-limiting examples, the operating parameter may be information regarding one or more network ports at the network switch device 100, information regarding one or more instrument ports at the network switch device 100, information regarding resources for the network switch device 100, information regarding packet filtering to be performed by the network switch device 100 (such as filtering rules, and network port(s) and instrument port(s) involved in the filtering rules).

In still further embodiments, a configuration item for access by the user may be a device, software, an algorithm, a database, a function of a device, a function of a software, or a database function, that has the ability to configure the network switch device 100. Such device, software, algorithm, or database may be a component in the network switch device 100 in some embodiments, or may be outside the network switch device 100 in other embodiments. Once access is provided to the user, the user may then input information to the device, software, algorithm, or database to configure the network switch device 100, such as to create a tool-mirror, to delete a tool-mirror, to edit a list of instrument ports, to add map (filtering) rule(s), to delete map rule(s), to add a map, to delete a map, to change port parameter(s), or combination thereof.

In some embodiments, the request from the user to access configuration item for the network switch device 100 may be a login information from the user, such as a user identification, a user password, or both. In other embodiments, the request from the user to access configuration item for the network switch device 100 may include an action item, or information regarding such action item. For example, the request from the user may be a command to access one or more ports of the network switch device 100, such as a network port, a plurality of network ports, an instrument port, a plurality of instrument ports, or combination thereof. In other examples, the request from the user to access configuration item for the network switch device 100 may be a request to view information regarding a configuration of the network switch device 100, to create a tool-mirror, to delete a tool-mirror, to edit a list of instrument ports, to add map rule(s), to delete map rule(s), to add a map, to delete a map, to change port parameter(s), or combination thereof.

Next, the processing unit determines whether to allow the user to access the configuration item for network switch device 100 based on information regarding the user (Item 204). In some embodiments, the information regarding the user may be a user identification. In other embodiments, the information regarding the user may be an access level that has been assigned to the user. In further embodiments, the information regarding the user may be both a user identification and an access level for the user.

In some embodiments, multiple users may access the network switch device 100, and each user may be assigned a role for accessing the network switch device 100. In some embodiments, the role of the user is associated with an access level for the user. In other embodiments, the role of the user may be considered an access level for the user, and vice versa. Depending on the access level for a particular user, when access is provided for the user, the user is allowed to access certain information. For example, in some embodiments, the access level for a particular user may prescribes which network port(s) of the network switch device 100 is accessible for the user. In other embodiments, the access level for a particular user may prescribes which instrument port(s) of the network switch device 100 is accessible for the user. In further embodiments, the access level for a particular user may prescribes which task(s) is allowed to be performed by the user. For example, a certain access level may allow the user to only view information regarding a configuration of the network switch device 100, while another access level may allow another user to both view information regarding a configuration of the network switch device 100, as well as configuring the network switch device 100. Also, in some embodiments, different access levels may allow different respective users to perform different tasks or different combination of tasks to configure the network switch device 100.

By providing access restriction on the network ports (e.g., ports connected to a network, such as through TAPs) and instrument ports (for connection to network monitoring instruments), the processing unit may control how users can perform certain tasks. To perform a task, the user must have adequate access level to the ports involved in the task. And thus the user or group of users is assigned an access level to each of the ports that need to be controlled. At the time when the task is performed, the processing unit will evaluate to see if the current user has the required access level to the involved ports. If the user has the required access level, the processing unit then allows the task to be performed. On the other hand, if the user does not have the required access level, the processing unit then prevents the task from being performed.

The access level that is assigned for each user or a group of users per port could either be a number, or a bit map of allowable tasks. A number may be used as a threshold, below or above which certain tasks are possible, and vice versa. A bitmap may be used to provide a finer control of different combination of tasks the user can perform for the ports.

Figure 3:
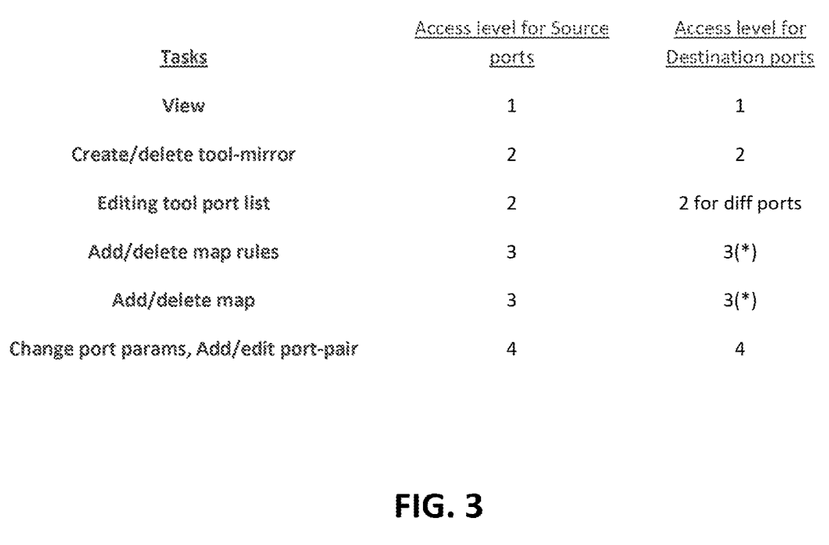
FIG. 3 illustrates an example of associating different access levels with different allowable tasks.

FIG. 3 illustrates an example of access levels assignment, which may be used in the method 200 for providing access to configuration item for the network switch device 100 in some embodiments. As shown in the figure, there are four different access levels, numbered 1-4, respectively. In the example, access level 1 has less access compared to access level 2, access level 2 has less access compared to access level 3, and access level 3 has less access compared to access level 4. In some cases, a higher access level may allow a user to perform all of the task in the lower access level. In other embodiments, the order of access levels may be reversed. As shown in the illustrated example, a user with access level 1 can only perform the task of viewing information regarding the network switch device 100. On the other hand, a user with access level 2 may create/delete tool-mirror, and may edit tool port list. Also as shown in the figure, a user with access level 3 may add/delete map rules, and add/delete map. A user with access level 4 may change port parameter(s), and may add/edit port-pair.

Following the above example, now assume the network switch device 100 has network ports N1, N2 connected to web servers, network port N3 connected to VOIP gateway, and network port N4 connected to a database. Also, considering the following additional example: User X is a visibility traffic administrator, user Y is a voice and web performance analyst who obtain packets for analysis using instrument ports T1, T2 at the network switch device 100, user Z is a web commerce analyst who obtain packets for analysis using instrument ports T3, T4 at the network switch device 100, and users A, B are ad-hoc trouble-shooting users. So the access level assignment for the various ports may be as follow:

Network port N1 (web): X 3, Y 3, Z 3, A 2, B 2
Network port N2 (web): X 3, Y 3, Z 3, A 2, B 2
Network port N3 (VOIP): X 3, Y 3, A 2, B 2
Network port N4 (database): X 3, Z 3, A 2, B 2
Instrument ports T1, T2: Y 3
Instrument ports T3, T4: Z 3 wherein the assignment has the format [user—access level]. Thus, the assignment "X 3" means that user X is assigned access level 3 for the particular port. With the above port/access level assignment, user X (who is assigned access level 3) may create any maps and edit any maps. On the other hand, users A and B, who are assigned access level 2, may only edit instrument port list to associate the instrument ports in the list with the map(s) created by user X. In some embodiments, only the administrative user can change the access level assignment.

Figure 4:
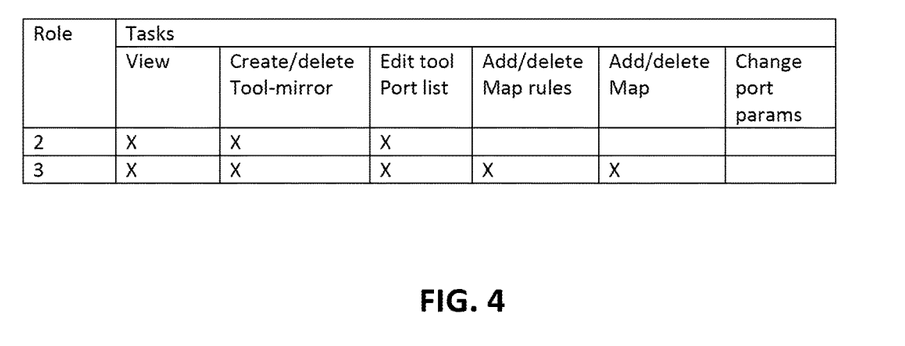
FIG. 4 illustrates an example of a bitmap for associating different allowable tasks with different access levels.

In other embodiments, a bitmap may be used to assign allowable tasks for certain role/access level. For example, as shown in FIG. 4, a bitmap may be provided that assigns "view", "create/delete tool-mirro", and "edit tool port list" as allowable tasks for role/access level No. 2. The same bitmap also assigns "view", "create/delete tool-mirro", "edit tool port list", "add/delete map rules", and "add/delete map" as allowable tasks for role/access level No. 3.

In some embodiments, the above access information (e.g., access levels, allowable tasks associated with the different access levels, ports assignments, etc.) may be stored in a non-transitory medium, which may be inside the network switch device 100 or may be outside the network switch device that can communicate with the network switch device 100. The non-transitory medium may also store a table that associates user identifications with corresponding access levels for different users. When the processing unit receives a request from a particular user, the processing unit determines an access level for the user. For example, the processing unit may look up the table that associates user identifications with corresponding access levels for different users, and uses the identification of the user (e.g., user ID) to look up the corresponding access level for that user. The processing unit then looks up the access information stored in the non-transitory medium, and based on the determined access level for the particular user, the processing unit then determines the configuration item that may be accessible by the user.

In some embodiments, the processing unit may receive a request from the user to perform a certain task to implement a configuration (e.g., a filtering configuration, a network flow configuration, etc.) for the network switch device 100. For example, the filtering configuration may involve certain filtering rule(s) that is desired to be implemented for the network switch device 100. The network flow configuration may be any mapping between one or more network ports to one or more instrument ports at the network switch device 100 (e.g., mapping one network port to multiple instrument ports, one network port to one instrument port, multiple network ports to one instrument port, or multiple network ports to multiple instrument ports). Thus, the configuration for implementation for the network switch device 100 may involve one or more network ports at the network switch appliance, one or more instrument ports at the network switch appliance, or both. Based on the access level that has been determined for the particular user, the processing unit may determine whether to allow the requested task to be performed to implement the configuration for the network switch device 100. For example, if the access level for the user has been determined to be "2", the processing unit then looks up the access information to fine a match for the access level, and also looks up the allowable tasks (which may be stored in a table or bitmap) that are associated with the matched access level. The processing unit then determines if the requested task is among the allowable tasks that are associated with the access level.

In some embodiments, a certain access level may allow a user to share connection(s) with other users. For example, a user X (with higher level of access) may be allowed to set up a map from certain network ports, with a certain number of rules. This map may be maintained by this user (or group of users), and may be shared to other users who are authorized to logically connect their instrument ports at the network switch device 100 to the map to subscribe to the traffic set up by the user X.

As illustrated in the above embodiments and examples, the method 200 and the device/system (e.g., the processing unit) for implementing the method 200 are advantageous because they allow certain user or group of users to have the right access level to perform certain task(s). By means of non-limiting examples, the task(s) may be one or a combination of the following:

Create different connections that take traffic from network ports to instrument ports.

View connection(s) that are using certain port(s) (e.g., network port(s), instrument port(s))

Share connection(s) with other users

Add, edit, or remove connection(s)

Add, edit, or remove filter(s) that is associated with certain port(s)

Add, edit, or remove filter(s) that is associated with certain connection(s)

Lock one or more ports to prevent one or more other users from changing a configuration parameter (e.g., a parameter of a filter) that involves the port(s), such as network port(s) and/or instrument port(s)

Add one or more other users to a share list, wherein the share list identifies user(s) who has access to certain port(s), such as network port(s) and/or instrument port(s)

It should be noted that the method 200 is not limited to providing user access to configuration item for the network switch device 100, and may be used to provide access to configuration item for other network switch appliances in other embodiments. For example, in other embodiments, the method 200 may be employed to provide access to configuration item for an openflow switch device.

Figure 5:
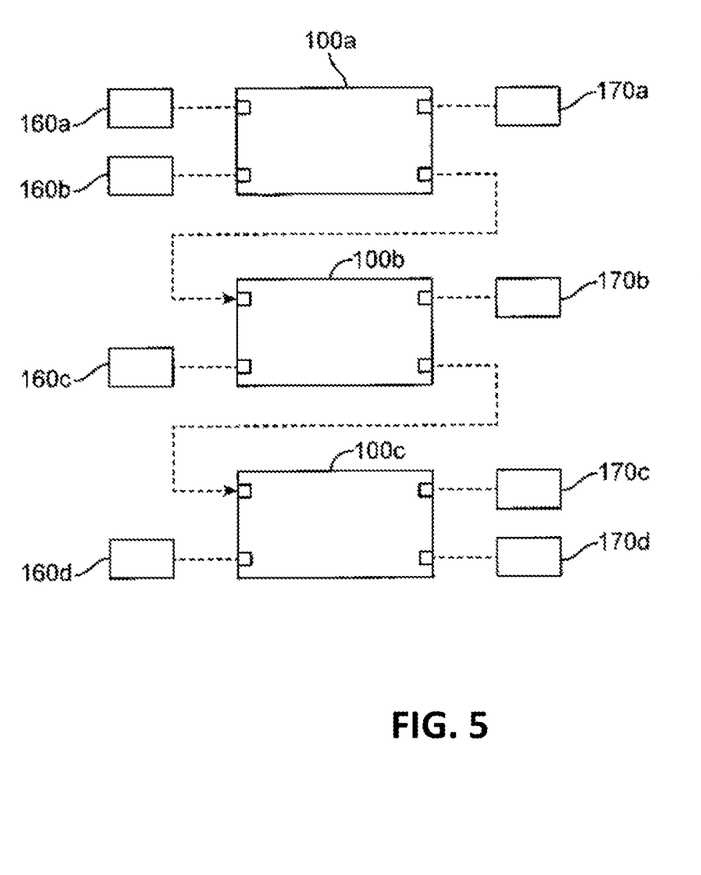
FIG. 5 illustrates a network switch appliance in a stacked configuration with one or more additional network switch appliance(s) in accordance with some embodiments.

In some embodiments, the method 200 may be performed for configuring a plurality of network switch devices 100 that are stacked together. FIG. 5 illustrates an example of a stacked configuration in which multiple network switch devices 100a-100b are stacked together. Network switch device 100a is communicatively coupled to a network monitoring instrument 170a, and nodes 160a, 160b. Network switch device 100b is communicatively coupled to a network monitoring instrument 170b, and node 160c. Network switch device 100c is communicatively coupled to network monitoring instruments 170c, 170d, and node 160d. In some embodiments, the stacked network switch devices 100 may be considered to be a network switch appliance (or device) itself.

Figure 6:
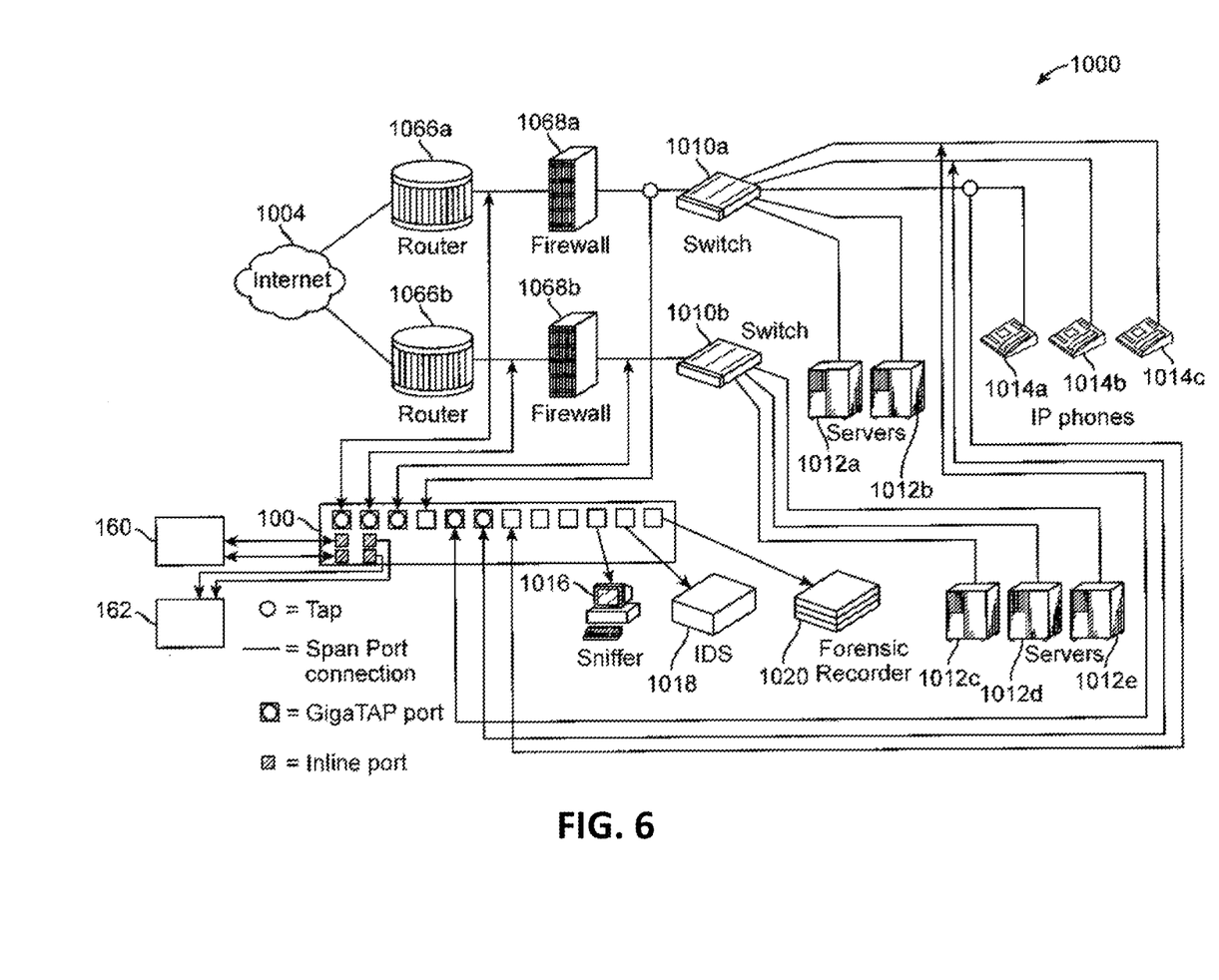
FIG. 6 illustrates a deployment of a network switch appliance in accordance with some embodiments.

FIG. 6 shows the deployment of the network switch device 100 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 100. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function.

In some embodiments, when using the device 100, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

Computer System Architecture

Figure 7:
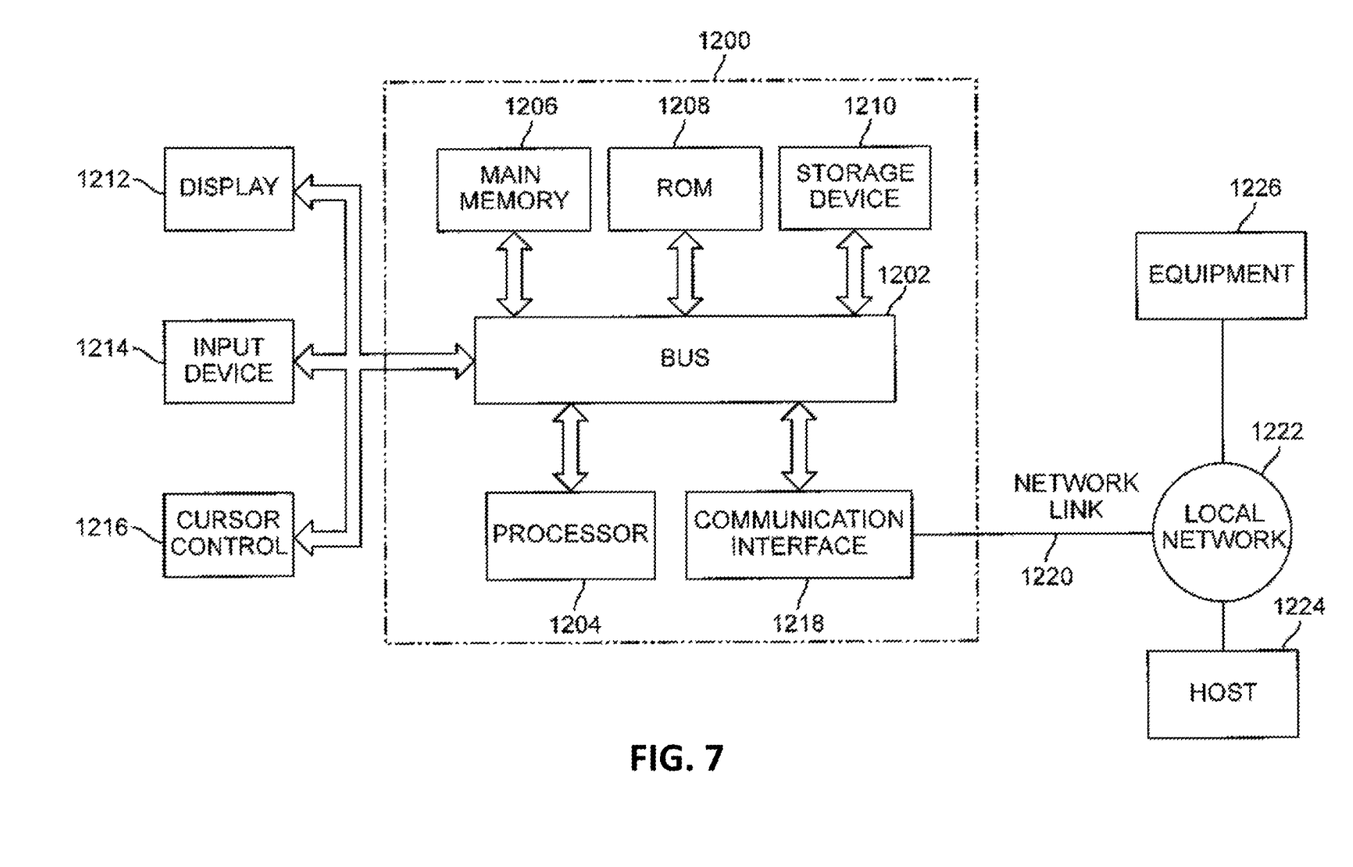
FIG. 7 illustrates an example of a computer system with which embodiments described herein may be implemented.

FIG. 7 is a block diagram that illustrates an embodiment of a computer system 1200 upon which embodiments described herein may be implemented. For example, in some embodiments, the computer system 1200 may be used to implement one or more functions of the processing unit 142, one or more functions of the switch 140 described herein, or one or more functions of the processing unit described herein. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method for providing user access to a network switch appliance, comprising:
   receiving from a user a request to access a configuration item for the network switch appliance, the network switch appliance configured to pass packets received from a network to a network monitoring instrument, the configuration item including a network port of the network switch appliance configured to receive the packets from the network and an instrument port of the network switch appliance configured to pass the packets to the networking monitoring instrument, the network port being a different port from the instrument port;
   obtaining access level assignment information associated with the user for the configuration item from an access information dataset including access information for a plurality of users corresponding to the network port and/or the instrument port, wherein the access information dataset includes a first set of access levels associated with the network port and a second set of access levels associated with the instrument port; and
   determining, using a processing unit, an access level associated with the user for the configuration item for the network switch appliance based on information regarding the user and the access level assignment information.

2. The method of claim 1, wherein the information regarding the user comprises a user identification, an access level that has been assigned to the user, or both.

3. The method of claim 2, wherein the access level is associated with a role assigned for the user.

4. The method of claim 2, wherein the access level prescribes which of a plurality of network ports at the network switch appliance is accessible for the user.

5. The method of claim 2, wherein the access level prescribes which of a plurality of instrument ports at the network switch appliance is accessible for the user.

6. The method of claim 2, wherein the access level prescribes which task(s) is allowed to be performed by the user to configure the network switch appliance.

7. The method of claim 1, further comprising determining an access level for the user.

8. The method of claim 7 further comprising:
   providing access for the user to the network port based on the access level for the user.

9. The method of claim 7 further comprising:
   providing access for the user to the instrument port based on the access level for the user.

10. The method of claim 7, wherein the act of determining the access level for the user comprises looking up access information that is stored in a non-transitory medium.

11. The method of claim 10, wherein the non-transitory medium is in the network switch appliance.

12. The method of claim 10, wherein the non-transitory medium comprises a database that is communicatively coupled to the network switch appliance.

13. The method of claim 7, further comprising:
   receiving a request from the user to implement a configuration for the network switch appliance, wherein the configuration involves one or more network ports at the network switch appliance, one or more instrument ports at the network switch appliance, or both; and
   determining whether to allow the user to implement the configuration based on the access level for the user.

14. The method of claim 13, wherein the act of determining whether to allow the user to implement the configuration comprises looking up a table in which multiple access levels are associated with respective sets of allowable tasks.

15. The method of claim 14, wherein the table comprises:
   a first access level associated with a first set of one or more allowable tasks; and
   a second access level associated with a second set of one or more allowable tasks that is different from the first set.

16. The method of claim 15, wherein the one or more allowable tasks in the first set comprises one or a combination of: view, create tool-mirror, delete tool-mirror, edit tool port list, add map rule, delete map rule, add map, delete map, add port-pair, edit port-pair, and change port configuration.

17. The method of claim 15, wherein the act of determining whether to allow the user to implement the configuration further comprises determining which of the first and second access levels matches with the access level for the user.

18. The method of claim 1, wherein the processing unit is a part of the network switch appliance.

19. An apparatus for providing user access to configuration item for a network switch appliance, comprising:
   a processing unit; and
   a memory having instructions which, when executed by the processing unit, configures the processing unit to perform operations including:
      receiving from a user a request to access the configuration item for the network switch appliance, the network switch appliance configured to pass packets received from a network to network monitoring instrument, the configuration item including a network port of the network switch appliance configured to receive the packets from the network and an instrument port of the network switch appliance configured to pass the packets to the networking monitoring instrument, the network port being a different port from the instrument port;

obtaining access assignment information associated with the user for the configuration item from an access information dataset including access information for a plurality of users corresponding to the network port and/or the instrument port, wherein the access information dataset includes a first set of access levels associated with the network port and a second set of access levels associated with the instrument port; and determining an access level associated with the user for the configuration item for the network switch appliance based on information regarding the user and the access assignment information.

20. The apparatus of claim 19, wherein the information regarding the user comprises a user identification, an access level that has been assigned to the user, or both.

21. The apparatus of claim 20, wherein the access level is associated with a role assigned for the user.

22. The apparatus of claim 20, wherein the access level prescribes which of a plurality of network ports at the network switch appliance is accessible for the user.

23. The apparatus of claim 20, wherein the access level prescribes which of a plurality of instrument ports at the network switch appliance is accessible for the user.

24. The apparatus of claim 20, wherein the access level prescribes which task(s) is allowed to be performed by the user to configure the network switch appliance.

25. The apparatus of claim 19, wherein the processing unit is further configured for determining an access level for the user.

26. The apparatus of claim 25, wherein the processing unit is further configured for providing access for the user to the network port based on the access level for the user.

27. The apparatus of claim 25, wherein the processing unit is further configured for providing access for the user to the instrument port based on the access level for the user.

28. The apparatus of claim 25, wherein the processing unit is configured to determine the access level for the user by looking up access information that is stored in a non-transitory medium.

29. The apparatus of claim 28, wherein the non-transitory medium is in the network switch appliance.

30. The apparatus of claim 28, wherein the non-transitory medium comprises a database that is communicatively coupled to the network switch appliance.

31. The apparatus of claim 25, wherein the processing unit is further configured for:

receiving a request from the user to implement a configuration for the network switch appliance, wherein the configuration involves one or more network ports at the network switch appliance, one or more instrument ports at the network switch appliance, or both; and determining whether to allow the user to implement the configuration based on the access level for the user.

32. The apparatus of claim 31, wherein the processing unit is configured to determine whether to allow the user to implement the configuration by looking up a table in which multiple access levels are associated with respective sets of allowable tasks.

33. The apparatus of claim 32, wherein the table comprises:

a first access level associated with a first set of one or more allowable tasks; and a second access level associated with a second set of one or more allowable tasks that is different from the first set.

34. The apparatus of claim 33, wherein the one or more allowable tasks in the first set comprises one or a combination of: view, create tool-mirror, delete tool-mirror, edit tool port list, add map rule, delete map rule, add map, delete map, add port-pair, edit port-pair, and change port configuration.

35. The apparatus of claim 33, wherein the processing unit is configured to determine whether to allow the user to implement the configuration by determining which of the first and second access levels matches with the access level for the user.

36. The apparatus of claim 19, wherein the processing unit is a part of the network switch appliance.

37. The apparatus of claim 19, wherein the processing unit is communicatively coupled to the network switch appliance.

38. The method of claim 1, wherein the configuration item is associated with a configuration of the network switch appliance.

39. The method of claim 1, wherein the configuration item comprises a parameter for configuring the network switch appliance.

40. The apparatus of claim 19, wherein the configuration item is associated with a configuration of the network switch appliance.

41. The apparatus of claim 19, wherein the configuration item comprises a parameter for configuring the network switch appliance.

42. The apparatus of claim 19, wherein the processing unit is further configured to enable a user to select one of a plurality of transmission schemes for transmitting the packets between a plurality of network ports and a plurality of instrument ports of the network switch appliance.

43. The apparatus of claim 42, wherein the one of the plurality of transmission schemes includes transmitting the packets between the network ports and the instrument ports using any of one-to-one transmission scheme, one-to-many transmission scheme, many-to-one transmission scheme, or many-to-many transmission scheme.

* * * * *